3,432,336
IMPREGNATION OF GRAPHITE WITH
REFRACTORY CARBIDES
Kasimir Langrod, Sherman Oaks, and Robert L. Jones, Canoga Park, Calif., assignors to North American Rockwell Corporation, a corporation of Delaware
No Drawing. Filed Aug. 25, 1964, Ser. No. 392,042
U.S. Cl. 117—118                                  11 Claims
Int. Cl. B44d 1/40; C04b 35/56, 35/54

ABSTRACT OF THE DISCLOSURE

A method of impregnating graphite with refractory metal carbides. A solution of a refractory metal salt, preferably an aqueous solution of an organic compound of a refractory metal such as an oxalate or acetate, is impregnated in the pores of a graphite member. The refractory metal salt is next hydrolyzed, preferably with a basic reagent which does not leave trace metal ions, to form the oxide or hydroxide. The hydrolyzed salt is then calcined at an elevated temperature in a non-oxidizing atmosphere, preferably at a temperature of about 1500–2400° C., in a vacuum or a noble gas, to yield the final product of a graphite body impregnated with a refractory metal carbide.

---

The present invention relates to a method of impregnating graphite with refractory carbides.

There are a number of applications of graphite where its relatively porous nature and lack of strong resistance to mechanical erosion are drawbacks. Graphite electrode tips utilized in arc melting operations are subject to erosion which may adversely affect the composition of the melts, particularly where control of carbon concentration is a factor. There is also interest in preventing attack by molten metal coolants on graphite, for example in nuclear reactor operation. Graphite brushes for electrical apparatus must also frequently operate under severe conditions which demand improved characteristics for the brushes. Surface coatings, including those of carbides, are found to be unsuccessful and peel off, due to such factors as differences in thermal expansion.

It is, therefore, an object of the present invention to provide a method of impregnating graphite with materials having high temperature stability and resistance to erosion.

It is another object to provide a method of impregnating graphite with refractory metal carbides.

It is another object to provide such a method which is relatively economical and rapid.

It is still another object of the present invention to provide graphite articles impregnated with refractory carbides.

The above and other objects and advantages of the present invention will become apparent from the following detailed description and the appended claims.

In accordance with the present invention, graphite may be impregnated with refractory metal carbides by contacting the graphite with a solution of a refractory metal salt to deposit the metal salt in the pores of said graphite, and then converting the resulting deposited refractory metal salt to the carbide. More specifically, the graphite is impregnated with solutions of the refractory metal salts, the impregnated body dried leaving the refractory metal salt depostied in the pores of the graphite, the deposited salt hydrolyzed to form the oxide or hydroxide, and the resultant compound converted to the carbide by calcining.

The refractory metal, as used herein, is selected from Groups IV–B, V–B, and VI–B of the periodic table of the elements and are characterized by high melting points, above about 1900° C. The following metals are included in this category: titanium, zirconium, hafnium, vanadium, niobium (columbium), tantalum, chromium, molybdenum, and tungsten.

The refractory metal may be dissolved in either aqueous or organic solvents in the form of any convenient, soluble salt such as halides, sulfates, or readily decomposable organic salts such as oxalates or acetates. Colloidal suspensions are not satisfactory since film formation on the surface of the graphite inhibits further passage of a colloidal slurry. The water-soluble organic salts are particularly satisfactory because they can be readily removed without leaving traces of other ions in the graphite. It is preferred to use saturated solutions of the refractory metal salt, in order to increase the concentration of the refractory metal deposited in the graphite.

To promote impregnation of the graphite with the solution of the refractory metal salt, volatile impurities are first removed from the graphite by outgassing in a vacuum while being heated to elevated temperatures such as 400° C. After the outgassing is complete, for example about 30 minutes is sufficient, the graphite is permitted to cool to room temperature.

The graphite is then soaked in the solution of the refractory metal salt until the graphite is saturated with the solution. While penetration can be obtained with simple soaking, it is found that better penetration is accomplished by the use of pressure. For example, a pressure of 300–700 p.s.i., is found to be satisfactory. The pressure may be applied by such means as a plunger positioned in a cylinder containing the graphite and the penetrant solution, movement of the plunger compressing the penetrant and forcing it into the pores of the graphite. The immersion time and the pressure exerted is a function of the physical configuration of the graphite and the degree of refractory metal penetration and density required, and also the porosity of the particular grade of graphite. For example, impregnation depths of ½ inch in ATJ grade graphite electrodes can be obtained by impregnating with saturated water solutions of the refractory metal salt for about ½ hour at a pressure of 500 p.s.i. and a temperature of 20° C. A few drops of a conventional wetting agent may also be added to the solution to promote penetration. Pressures in the order of 5000 p.s.i. may be used where penetrations to greater depths or in less time are required.

After impregnation the graphite specimens are dried, leaving the refractory metal salt deposited in the pores of the graphite. The sample is then preferably hydrolyzed with a basic reagent prior to calcination, in order to convert the salt, which might be volatile, into the more stable, refractory oxide and ensure the yield of carbide. It is desirable to use a reagent which does not leave a residue on calcination, such as an ammonium ion-containing solution, for instance aqueous ammonium hydroxide or ammonium bicarbonate. The graphite bodies are now dried thoroughly, for example oven-dried at about 300° F., to prevent damage to the graphite during the subsequent high temperature calcination.

The refractory metal hydroxide or oxide is then converted to the carbide by heating at elevated temperatures in a vacuum or a non-oxidizing atmosphere, for example a noble gas such as argon. It is generally found that heating at a temperature of about 1500–2400° C. for about 1–4 hours is sufficient to convert the refractory metals to the carbides, the time and temperature varying in part with the particular refractory metal. For example, oxides of zirconium or niobium may be converted to the carbides by vacuum induction heating to about 2200° C. in 2 hours, followed by an additional 2 hours at temperature, and then by furnace cooling to ambient temperature.

The following examples are offered to illustrate the present invention in greater detail.

Example I

About 1800 grams of zirconium acetate are dissolved in 1 liter of water. A 4" x 4" x 1/8" plate of graphite is impregnated with the solution by subjecting the plate to a pressure of 500 p.s.i. at a temperature of 20° C. for 1/2 hour in a pressure vessel filled with the solution. The impregnated plate is air-dried in a furnace at a temperature of 300° F. for 1 hour. The dried plate is then hydrolyzed by submerging for 10 minutes at room temperature in a 5 normal ammonium hydroxide solution to convert the deposited salt to zirconium oxide. After thorough drying in air for 3 hours at 300° F., the graphite plate is calcined by induction heating to 2200° C. for 1 hour in an atmosphere of argon, thereby producing graphite impregnated with zirconium carbide.

Example II

The procedure of Example I is followed except that 300 grams of niobium oxalate are dissolved in 1 liter of water, and graphite impregnated with niobium carbide is produced.

Example III

The procedure of Example I is followed except that 150 grams of vanadium chloride are dissolved in 1 liter of water, and graphite impregnated with vanadium carbide is obtained.

The foregoing examples are merely illustrative of our invention and should not be construed as limiting in scope. The invention is understood to be limited only as is indicated in the appended claims.

Having thus described our invention, we claim:

1. A method of impregnating graphite with a refractory metal carbide, which comprises forming a solution of a soluble refractory metal salt, impregnating the graphite with said solution to deposit said salt in the pores of the graphite, hydrolyzing said salt, and then calcining the hydrolyzed salt under non-oxidizing conditions at a temperature of about 1500–2400° C. to produce the refractory metal carbide.

2. The method of claim 1 wherein said refractory metal salt is selected from the group consisting of refractory metal halides, oxalates, and acetates.

3. The method of claim 1 wherein said calcining is performed for a period of about 1 to 4 hours.

4. The method of claim 1 wherein said hydrolysis is performed with a non-residue-leaving basic solution.

5. The method of claim 1 wherein the impregnation is performed under pressure above ambient.

6. A method of impregnating graphite with a refractory metal carbide, which comprises forming an aqueous solution of a refractory metal salt selected from the group consisting of refractory metal halides, acetates, and oxalates, impregnating said solution into said graphite at a positive pressure above ambient, thereby depositing said salt in the pores of said graphite, hydrolyzing the deposited salt with an aqueous basic solution, calcining the resulting hydrolyzed salt under non-oxidizing conditions at a temperature of about 1500–2400° C. for about 1–4 hours to convert the hydrolyzed salt to the carbide.

7. The method of claim 6 wherein said basic solution is ammonium ion-containing.

8. The method of claim 6 wherein said pressure is in the range of about 300–700 p.s.i.

9. The method of claim 6 wherein said refractory metal salt is niobium oxalate.

10. The method of claim 6 wherein said refractory metal salt is vanadium chloride.

11. A method of impregnating graphite with zirconium carbide which comprises forming a saturated aqueous solution of zirconium acetate, impregnating graphite with said solution at a pressure of about 500 p.s.i., hydrolyzing the resulting impregnated salt with aqueous ammonium hydroxide to convert the deposited zirconium salt to zirconium oxide, and then calcining the resulting graphite body at a temperature of about 2200° C. for about 1 hour in argon to obtain zirconium carbide.

References Cited

UNITED STATES PATENTS

| | | | |
|---|---|---|---|
| 3,151,852 | 10/1964 | Weech et al. | 117—118 X |
| 3,073,717 | 1/1963 | Pyle et al. | 117—118 X |
| 3,042,822 | 7/1962 | Savage et al. | 117—228 X |
| 2,978,358 | 4/1961 | Campbell | 117—118 X |
| 2,939,803 | 6/1960 | Steele | 117—169 |
| 2,917,404 | 12/1959 | Meltzer et al. | 117—228 X |

FOREIGN PATENTS 680,237    2/1964    Canada.

ALFRED L. LEAVITT, *Primary Examiner.*

A. M. GRIMALDI, *Assistant Examiner.*

U.S. Cl. X.R.

117—46, 228